United States Patent [19]

Hare et al.

[11] 3,916,154

[45] Oct. 28, 1975

[54] METHOD AND CIRCUITRY FOR DECODING A HIGH DENSITY BAR CODE

[75] Inventors: George H. Hare, San Mateo, Calif.; Edward A. Ulmer, Verona, N.J.; Stephen A. Digney, Dublin, Calif.

[73] Assignee: The Singer Company, New York, N.Y.

[22] Filed: Jan. 6, 1975

[21] Appl. No.: 538,828

[52] U.S. Cl. .......... 235/61.11 E
[51] Int. Cl.$^2$ .......... G06K 7/10
[58] Field of Search .......... 235/61.11 E, 61.11 D, 61.12 N; 340/146.32; 250/555, 566

[56] References Cited

UNITED STATES PATENTS

| | | | |
|---|---|---|---|
| 3,562,494 | 2/1971 | Schmidt | 235/61.12 N |
| 3,783,245 | 1/1974 | Howell | 235/61.12 N |
| 3,784,792 | 1/1974 | Dobras | 340/146.3 Z |
| 3,811,033 | 5/1974 | Herrin et al. | 340/146.3 Z |
| 3,838,251 | 9/1974 | Herrin | 235/61.12 N |

*Primary Examiner*—Daryl W. Cook
*Attorney, Agent, or Firm*—Edward L. Bell; Joseph R. Dwyer; Linval B. Castle

[57] ABSTRACT

A high density multiple bar code, such as the Universal Product Code, is scanned to determine the displacement of adjacent leading edges and trailing edges of the bars and also to determine the width of each bar and each space. The character represented is determined by comparing the displacement of trailing edges of the bars, the width of various bars and spaces, and ambiguities are resolved by comparing the widths of the middle bar and space. The various selected displacements result in ratios that are very widely separated, thereby providing very reliable results with relatively inexpensive recognition circuitry which converts the measured displacements into corresponding analog voltage levels and then compares the various levels and produces binary outputs representing the character that was sensed.

10 Claims, 4 Drawing Figures

METHOD AND CIRCUITRY FOR DECODING A HIGH DENSITY BAR CODE

BACKGROUND OF THE INVENTION

This invention relates to a method and circuitry for reading high density bar codes, such as the Universal Product Code, or the like. The Universal Product Code, hereinafter referred to as UPC, has been adopted by business establishments which print an identifying number, such as a stock number, in the form of a bar code on each item of merchandise. An optical reader located at the cashier's stand may then scan the merchandise package to sense the code thereon and relay that coded number to a data processor and associated memory, which then signals the price data to the checkout stand register and maintains a continuous inventory of the merchandise, a record of total transactions, tax records, etc.

In a multiple bar code, such as the UPC, each decimal number is represented by two pairs of vertical bars and spaces within a 7-bit pattern wherein a binary 1 represents a dark module or bar, and a 0 represents a light module or space. Thus, a decimal 1 may be represented in the UPC by the 7-bit pattern, 0011001; a decimal 2 by 0010011; a 3 by 0111101; a 4 by 0100011, etc. It can therefore be seen that the decimal 1 would be comprised of an initial space of a 2-bit width, followed by a 2-bit wide bar, another 2-bit space, and a 1-bit bar. Similarly, a 3, for example, is represented by a 1-bit space followed by a 4-bit bar, a 1-bit space, and a 1-bit bar. It will be noted that for any numeral there are two bars and two spaces. Furthermore, in this form of UPC, each pattern always begins with a space and ends with a bar. The purpose of this is primarily to enable the reading circuitry to determine the beginning and end of each 7-bit pattern.

A multiple bar code, such as the UPC, is normally read by an optical reader which scans the several 7-bit patterns and transmits electrical signals representing the bars and spaces to a data processor which determines the decimal numbers represented by the pattern by comparing various displacements within each 7-bit module to the total module width. Since distortions in printing the UPC upon the merchandise may result from surface distortions, ink spread, etc., the displacements measured by the data processor cannot be limited only to the width of a bar or space, but must include the displacement between separate adjacent spaces and separate adjacent bars. For example, a UPC representation of the decimal 5 may be 0110001. The displacement between the leading edges of the spaces is three bits and the displacement between adjacent bars is seen to be five bits. The two ratios that represent the numeral 5 are therefore 3/7 and 5/7. Inasmuch as the UPC employs a 7-bit module containing two bars and two spaces, the various ratios measured by the scanner and converted by the data processor must be either 2/7, 3/7, 4/7 or 5/7. It follows therefore that to distinguish certain characters, it is occasionally necessary that the logic unit in the data processor to be sufficiently accurate to distinguish between the two numbers 4/7 and 5/7, two numbers with less than a 25% difference between them.

In practice, there are several factors that act to alter the apparent values of the characteristic ratios. Printing variations within a symbol can alter the measured ratios. Curvature and other distortions of the surface on which the symbol is printed can produce some variation in the desired values of the ratios. In some scanning systems, small systematic variations of the effective scanning speed may contribute small errors to the observed ratios. Because of these sources of variations or errors in the expected ratios, it is necessary that the scanning system be provided with some form of threshholding decision capability which, in effect, decides which each particular ratio should be, and outputs a binary decision between two theoretically correct possible ratio values. The theoretically corrected values selected are then transferred to a set of binary logic circuits which determine which particular decimal digit must have been observed.

Unfortunately, all practical threshholding circuits are subject to some small errors. Thus, the exact threshhold value used to decide between two theoretically correct values may change from time to time as a result of changes in temperature, voltage, component age, etc. If the expected theoretical values to be distinguished are relatively close together, then small variations in the exact threshhold value may significantly increase the frequency of erroneous decisions. To minimize the possibility of such wrong decisions, it is therefore desirable to employ a decoding system which maximizes the differences between theoretically correct expected ratios.

As mentioned above, prior art bar code decoding systems read the characters by measuring the displacements between leading edges of adjacent bars and leading edges of adjacent spaces, and by comparing these displacements with the total width of the character to obtain ratios of either 2/7, 3/7, 4/7, or 5/7. In the present invention, greatly improved accuracy is achieved by measuring all displacements between bars and spaces and by comparing various displacements, to be subsequently described, to obtain widely varying ratios easily distinguished from each other by relatively simple and inexpensive circuitry wich converts each measured displacement into an analog voltage level, compares the various levels to determine which of four possible ratios are present, and produces a binary output that accurately identifies the numerical character that was read.

In the drawings which illustrate a preferred embodiment of the invention:

Figure 1:
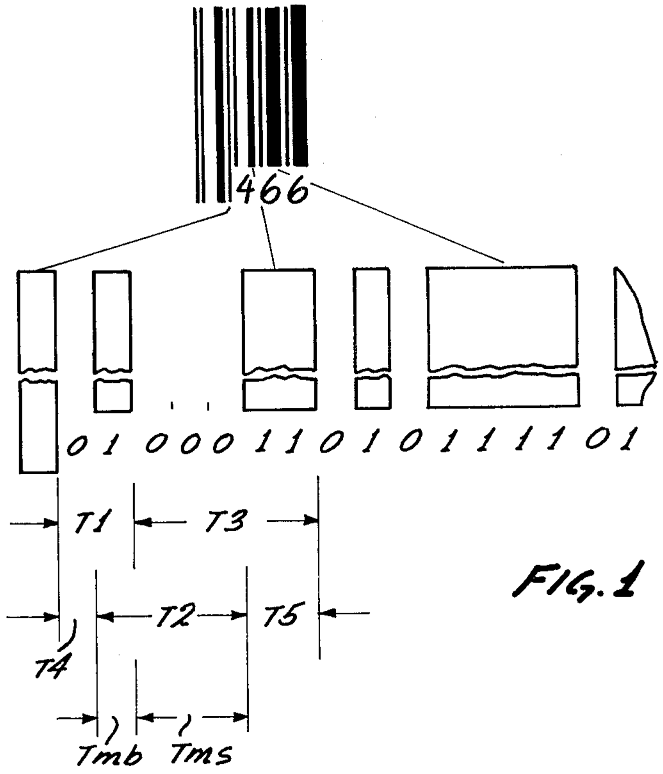
FIG. 1 illustrates a portion of a typical Universal Product Code.

As mentioned above, the prior art method for reading a high density bar code, such as the UPC, includes the measuring of displacements between leading edges of adjacent bars and leading edges of adjacent spaces and developing ratios of these displacements to the entire character width of 7-bits. Thus, referring to FIG. 1 of the drawings, the numeral 4 which, in one form of the UPC IS represented by 0100011, would be identified by the ratios of $T1/(T1 + T3)$ and $T2/(T1 + T3)$, where T1 is the displacement between leading edges of adjacent spaces and T2 is the displacement between leading edges of bars. For the numeral 4, therefore, these ratios would be 2/7 and 4/7. It is to be noted that each numeral is represented by two ratios and in the prior art method of reading the UPC, these two ratios are within the range of 2/7 to 5/7. It is necessary, therefore, that the electronic circuitry carefully distinguish between closely related numbers, such as 4/7 and 5/7.

In the present invention, each numeral is represented by the ratios, T1/T3 and (T4 + T5)/T2. These ratios result in widely varying values that are easily distinguishable by the subsequent electronic circuitry. For example, the numeral 4 illustrated in FIG. 1 would be represented by the ratio T1/T3 or 2/5, and (T4 + T5)/T2, or ¾. Similarly, for the numeral 6, the ratios would be 2/5 and (1 + 4)/2 or 5/2. According to the present invention, all ratios must be either 2/5, ¾, 4/3, or 5/2.

In any bar code there is a probability of an ambiguity between two or more numbers. In reading the UPC, either by the prior art method or by the present invention, an ambiguity exists between the numerals 1 and 7, and also between 2 and 8. For example, in the present invention, the ratios identifying the numerals 1 and 7 are 4/3 and ¾; the ratios identifying the numerals 2 and 8 are ¾ and 4/3. To distinguish between these numerals and thus resolve the ambiguity, the width of the middle bar, Tmb, and the width of the middle space, Tms, are measured and the ratio Tmb/Tms is generated. Therefore, for the numerals 1, 2, 7, and 8, three ratios are established.

Figure 2:
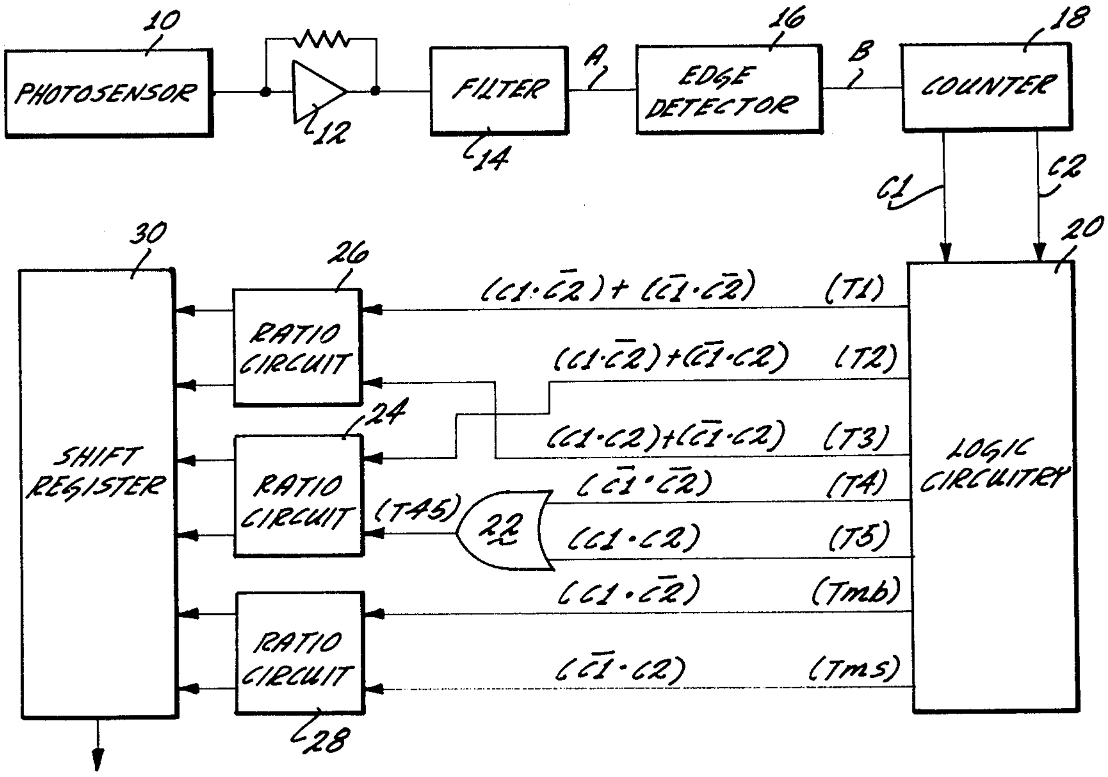
FIG. 2 is a block diagram of the circuitry of the invention.

FIG. 2 is an illustration of the block diagram of circuitry for decoding the encoded UPC data. Input information is introduced to a photosensor 10 which receives light reflected from the symbol as it is scanned by an optical scanning mechanism. The output photosensor 10 is applied through a feedback amplifier 12 and electronic filter 14 to an edge detector 16 which produces a train of output pulses coincident with the transitions of the edge detector input waveform as shown in curves A and B of FIG. 4. The output of the edge detector 16 is applied to the clock input of a two-stage binary counter 18 which advances one binary count each time the waveform A, of FIG. 4, undergoes a transition as signalled by the waveform B. Counter 18 consists of two stages having outputs C1 and C2. The numerals associated with these outputs correspond to the weights attributable to these stages. Counter 18 therefore produces four binary output states, 00, 01, 10, and 11, as the input from the sensor 10 varies as a digit is scanned.

In the following description, reference numerals enclosed in parentheses will indicate an electrical signal at the line or terminal adjacent the numeral. Thus, the reference numerals C1 and C2 will represent output terminals while (C1) and (C2) represent the signals that may be produced at those terminals.

The output terminals C1 and C2 of counter 18 are coupled to a logic circuitry 20 which provides seven output signals corresponding to the various displacements measured by the input photosensor. The output (T1) of logic circuit 20 is available when the counter 18 is at a count 1 or count 2 and corresponds to the time when the counter 18 output (C2) is in a logical 0 state. Logic circuit 20 output (T2) corresponds to the time when counter 18 is at count 3 or count 4 and is represented by the logical condition; $(C1 \cdot \bar{C}2) + (\bar{C}1 \cdot C2)$. This logical condition is easily generated in the logic circuitry by the well-known exclusive OR circuit.

During states 3 and 4 of counter 18, logic circuit 20 output (T3) is present and counter 18 output (C2) is in a logical 1 state. Logic circuit output (T4) corresponds to $(\bar{C}1 \cdot \bar{C}2)$, and is available during counter 18 state 1. The fourth state of counter 18 is the logical condition $(C1 \cdot C2)$ and during this time period, output (T5) is available. (Tmb) corresponds to the second state counter 18 and (Tms) corresponds to the third state, as indicated in FIG. 2 and shown in the curves of FIG. 4.

Outputs (T4) and (T5) of logic circuitry 20 are applied to an OR gate 22, the output of which is applied together with output (T2) to a ratio circuit 24. Similarly, outputs (T1) and (T3) are applied to a ratio circuit 26 and outputs (Tmb) and (Tms) are applied to a ratio circuit 28. The ratio circuits 24, 26, and 28 are for converting the temporal measurements (T1), (T2), (T3), (T4), (T5), (Tmb) and (Tms), into binary characters representing the scanned digit and the outputs from these ratio circuits are inserted into the shift register 30, which thereby contains the binary data required for interpreting the digits scanned.

Figure 3:
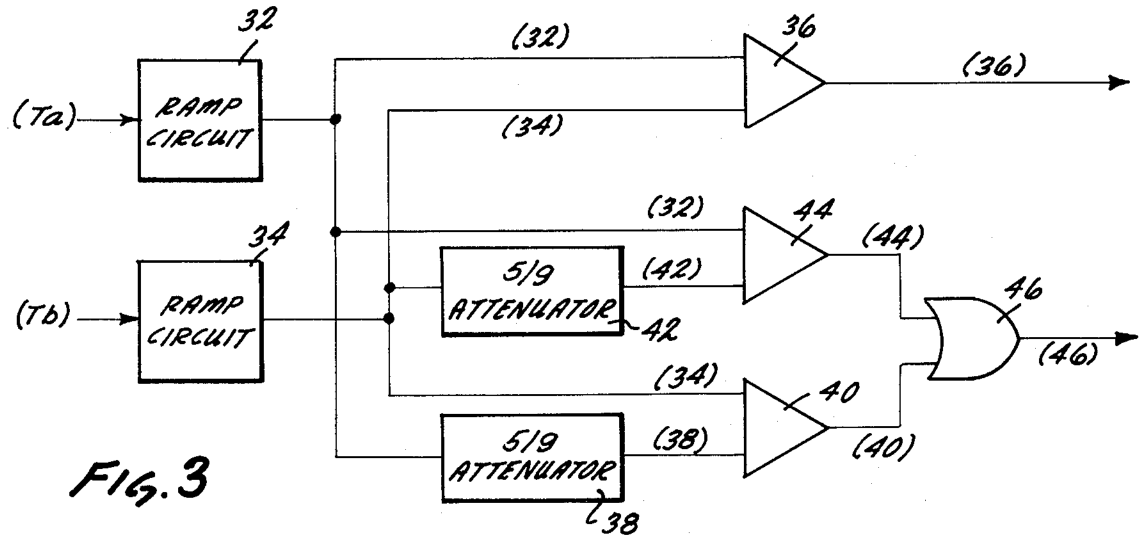
FIG. 3 is a block diagram of a typical ratio circuit illustrated in FIG. 2.

FIG. 3 is a block diagram of a ratio circuit as shown in the circuitry of FIG. 2. The ratio circuits are used to convert the temporal measurements discussed above into binary characters representing the scanned digit. The ratio circuit of FIG. 3 comprises a ramp circuit 32 which receives a voltage signal (Ta) which may correspond to either (T1), (T45) or (Tmb) of FIG. 2. In operation, the output voltage level of the ramp generator 32 continues to rise while (Ta) is present. Upon removal of (Ta), the attained voltage level is then held while ramp generator 34 functions in the same manner but under the control of the input signal (Tb) which corresponds to either (T2), (T3), or (Tms) of FIG. 2. Thus, one ramp generator measures the time that (Ta) is at a logical 1 level, and the other ramp generator measures the time that (Tb) is at a logical 1 level. (Ta) and (Tb) correspond to the lineal spacing of white to black or black to white transitions on the symbol being scanned, or in the case of (Tmb) and (Tms), the width of the middle bar or middle space, respectively.

Figure 4:
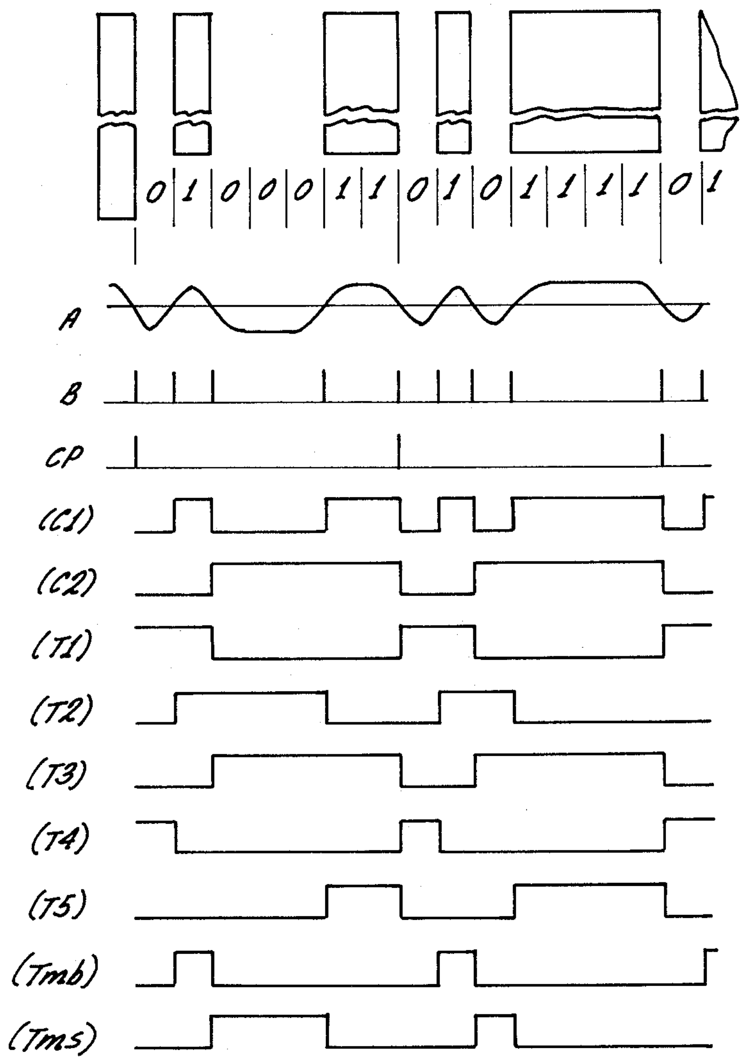
FIG. 4 is an illustration of a portion of the Universal Product Code illustrated in FIG. 1 and corresponding waveforms of signals appearing at various points in the block diagram of FIG. 2.

The outputs of the ramp generators 32, 34 are compared to each other at the completion of the scanning of a digit as signalled by the clock pulse signal Cp of FIG. 4, which pulse occurs at the trailing edge of the second bar in each character module. The comparison process is performed by differential amplifier-type voltage comparators 36, 40 and 44 of FIG. 3. The ramp generators 32 and 34 are reset after their output voltages have been compared.

As previously mentioned, the possible values for the ratios of time periods (T1/T3) and (T4 + T5)/(T2) are 2/5, ¾, 4/3, and 5/2. The mid-point between the ratios 2/5 and ¾ is 5/9, the mid-point between ¾ and 4/3 is 1, and the mid-point between 4/3 and 5/2 is 9/5. These mid-points are the decision points used by the ratio circuit to categorize the ratios. It is apparent that other mid-points, such as the arithmetic mean, could be selected.

In FIG. 3, the output signal 32 of ramp circuit 32 is compared to the output signal 34 of ramp circuit 34 by a comparator 36. If the signal 32 is greater than 34, the output 36 of comparator 36 will be at a logical 1 level, signifying the ratio between (Ta) and (Tb) must be either 4/3 or 5/2. If, on the other hand, signal 32 is less than 34, output signal 36 will be at a logical 0 level, signifying a ratio between (Ta) and (Tb) of 2/5 or ¾.

Ramp circuit 32 is coupled to attenuator 38 which is adjusted to attenuate the output signal 32 of ramp circuit 32 so that the attenuator output signal 38 is equal to 5/9 of 32. Attenuator 38 and ramp circuit 34 are coupled to comparator 40 which compares the signals 38 with 34. If the signal 34 is less than 38, corresponding to the signal 34 being less than the previously mentioned decision point of 5/9 of 32, the output 40 of comparator 40 will produce a logical 1. This condition signifies that the ratio of 32 to 34 is 5/2.

The output of ramp circuit 34 is also connected to an attenuator 42, which attenuates the output signal 34 so that the output of attenuator 42 produces a signal, 42, equal to 5/9 of 34. The output terminals of attenuator 42 and ramp circuit 32 are connected to the comparator 44 which compares the signals 42 with 32. If the level of 32 is less than that of 42, corresponding to 32 being less than 5/9 of 42, the output 44 of comparator 44 is at a logical 1, signifying that the ratio of 32 to 34 is 2/5.

Output signals 40 and 44 from comparators 40 and 44, respectively, are applied to an OR circuit 46. The output signal 46 of circuit 46 is at a logical 1 when signals 40 or 44 are at a logical 1 corresponding to a ratio of 32 to 34 of either 2/5 or 5/2. Thus, the signal 46 along with the output 36 of comparator circuit 36 completely categorizes the ratio of 32 to 34. Since the signals 32 and 34 are the voltage representations of the time periods (Ta) and (Tb), the ratios of 36 and 46 also categorize the ratios of (Ta) and (Tb). Ratio circuit 28, which has as its inputs the signals (Tmb) and (Tms), categorizes the ratio of its inputs in a similar manner to ratio circuits 24 and 26.

The binary signals generated by the ratio circuits 24, 26 and 28 of FIG. 2 are inserted into a 6-channel shift register 30 so that scanning of the register by subsequent processing circuitry will then yield binary data required for interpreting the scanned digits.

What is claimed is:

1. A method for decoding a high-density multiple bar code in which each numeral is represented in the code by a module comprising a pair of bars and spaces, each bar and space having a particular width for each numeral, the total widths of the bars and spaces in each module being equal for all numerals, the method comprising the steps of:

measuring the displacement between leading edges of the bars in the module representing the encoded numeral;

measuring the displacement between the leading edges of the spaces in the module representing the encoded numeral;

measuring the widths of each bar and each space in the module; and categorizing the measured displacement and widths with respect to each other whereby the categorizations uniquely define the bar coded representations.

2. The method claimed in claim 1 wherein the categorizing step includes the steps of:

generating a numerical ratio proportional to the displacement between the leading edges of the spaces in a module to a displacement between the leading edge of the second space and the trailing end of the module; and generating a numerical ratio proportional to the sum of the widths of the first space and second bar to the displacement between the leading edges of the first and second bar.

3. The method claimed in claim 2 including the further step of generating a numerical ratio proportional to the width of the first bar to the width of the second space, said numerical ratio for resolving ambiguities between previously generated ratios.

4. Circuitry for decoding a high-density multiple bar code in which each numeral is represented in the code by a module comprising a pair of bars and spaces, each bar and space having a particular width for each numeral, total widths of the bars and spaces in each module being equal for all numerals, said circuitry comprising:

scanning means for scanning the bar code representation and for generating electrical signals representing the transition points between said bars and spaces;

logic circuitry responsive to said scanning means for generating a plurality of unique signals indicative of the time required to scan between adjacent leading edges of the spaces, between adjacent leading and adjacent lagging edges of the bars within the modules, and the widths of each bar and space within the module; and comparison circuitry coupled to said logic circuitry and responsive to the signals generated therein for comparing selected pairs of said signals and for generating output signals representing the numerals scanned by said scanning means, said comparison circuitry including ramp circuitry coupled to said logic circuitry for developing analog ramp voltage levels proportional to each of said selected pairs of signals, and ratio circuitry coupled to said ramp circuitry for generating binary output signals indicating which of said ramp voltages is at a higher level.

5. The circuitry claimed in claim 4 wherein said comparison circuitry further included decision circuitry coupled to said ramp circuitry for developing decision points in said analog ramp voltage levels at which the binary output signals of said ratio circuitry will change.

6. The circuitry claimed in claim 4 wherein said comparison circuitry is coupled to said logic circuitry for comparing signals representing displacements between leading edges of the spaces with those representing the lagging edges of the bars in a module, and signals representing the sum of the widths of first space and second bar with the displacement between leading edges of the bars in the module.

7. The circuitry claimed in claim 6 wherein said comparison circuitry is coupled to the logic circuitry for comparing signals representing the width of the middle bar with the signal representing the width of the middle space in a module.

8. The circuitry claimed in claim 6 wherein said scanning means includes an optical scanner, and an edge detector coupled to said scanner for generating electrical pulses representing the transition points between spaces and bars in the scanned module.

9. The circuitry claimed in claim 8 wherein said logic circuitry includes a two-stage binary counter responsive to the electrical pulses generated by said edge detector.

10. The circuitry claimed in claim 9 further including a shift register coupled to receive and hold the binary output signals generated by said comparison circuitry.

* * * * *